April 2, 1946.  F. W. KUPPERSMITH  2,397,493
TOOL JIG
Filed Nov. 5, 1942  3 Sheets-Sheet 1
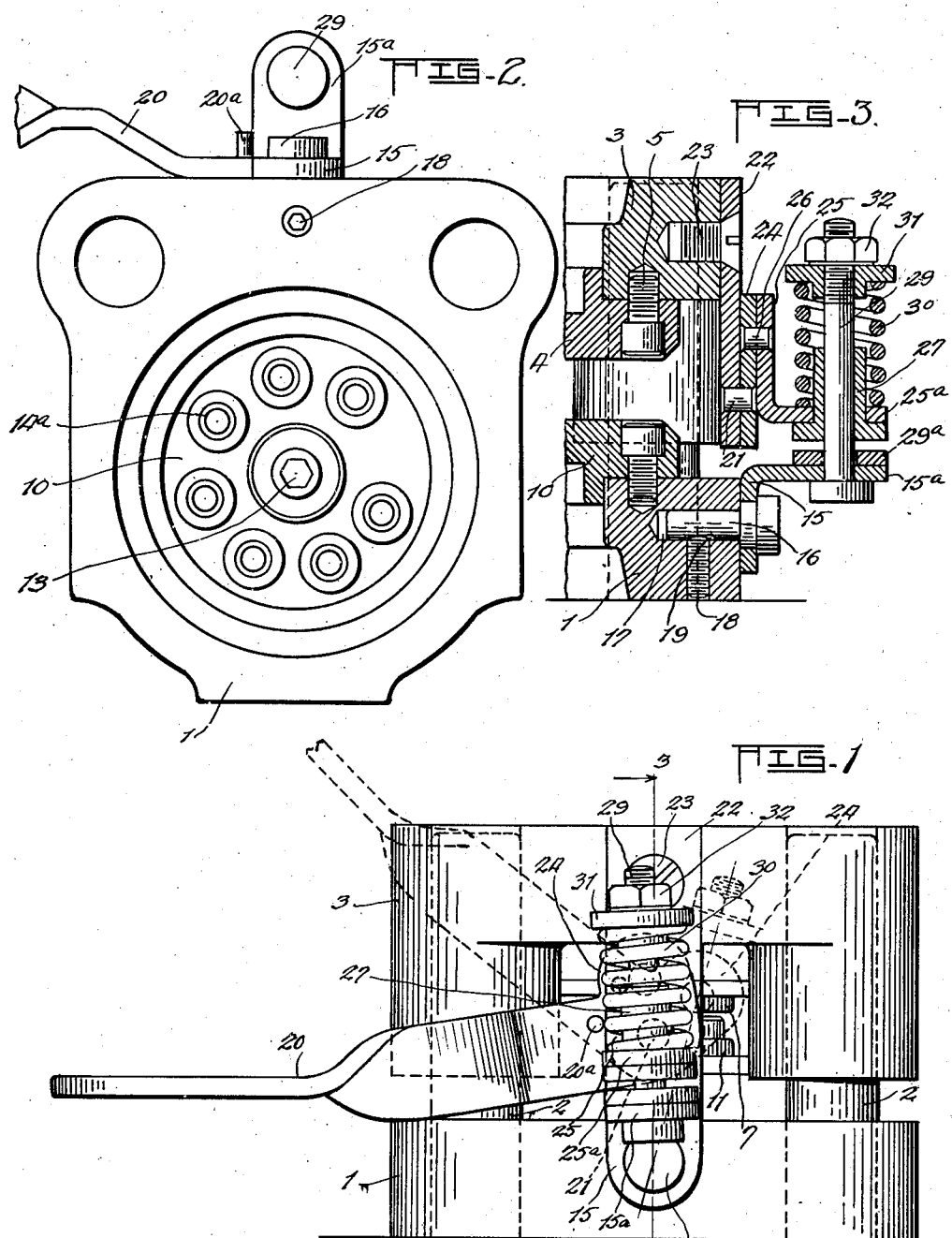
INVENTOR.
FRED W. KUPPERSMITH
BY Thiess, Olson & Mecklenburger

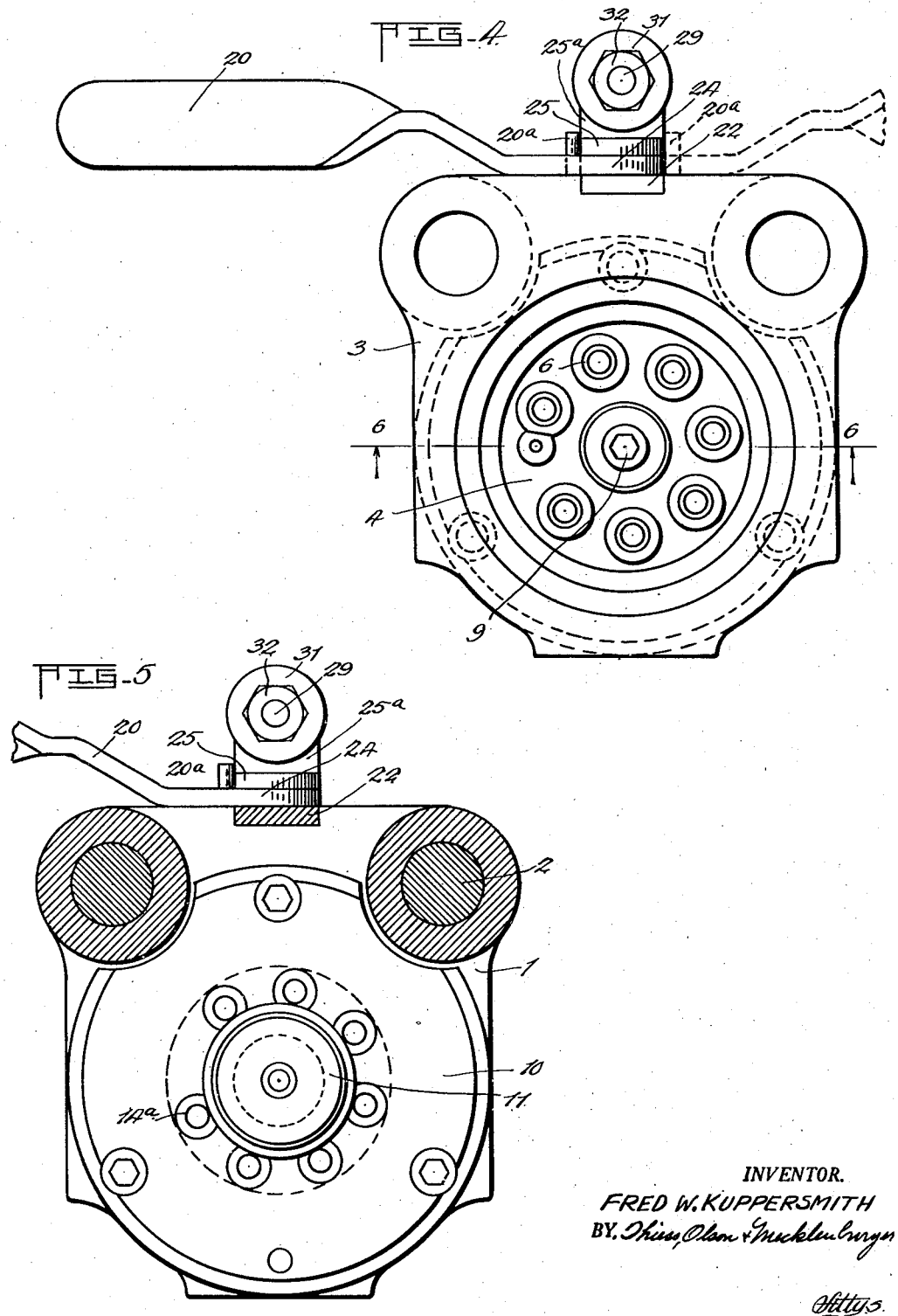

April 2, 1946.   F. W. KUPPERSMITH   2,397,493
TOOL JIG
Filed Nov. 5, 1942   3 Sheets-Sheet 3
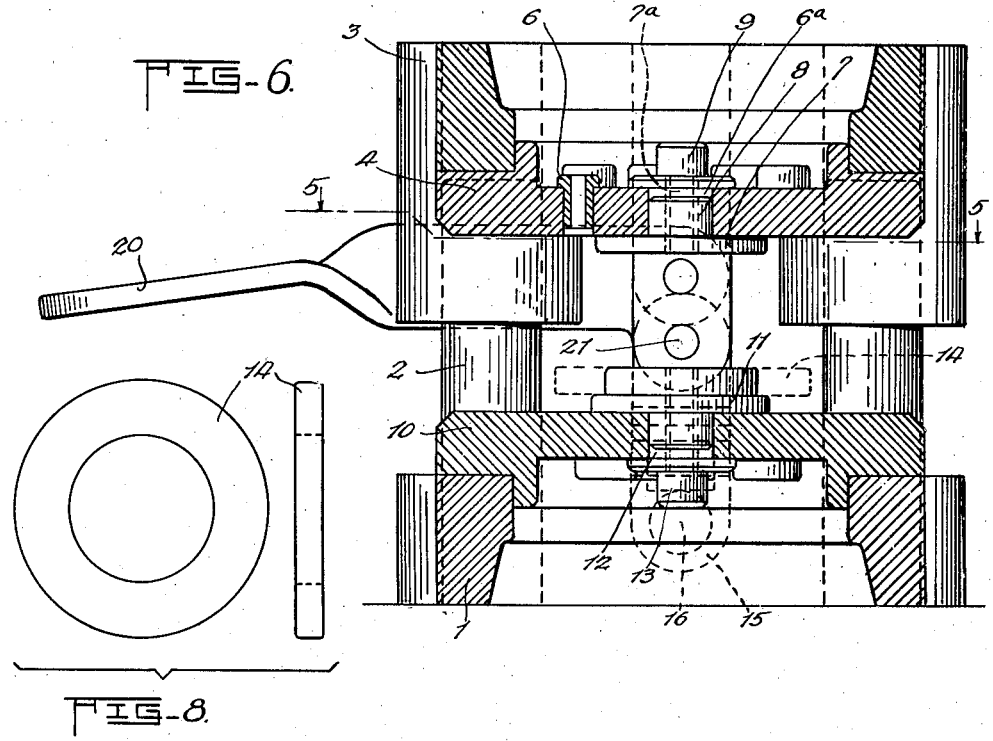
FIG-6.
FIG-8.
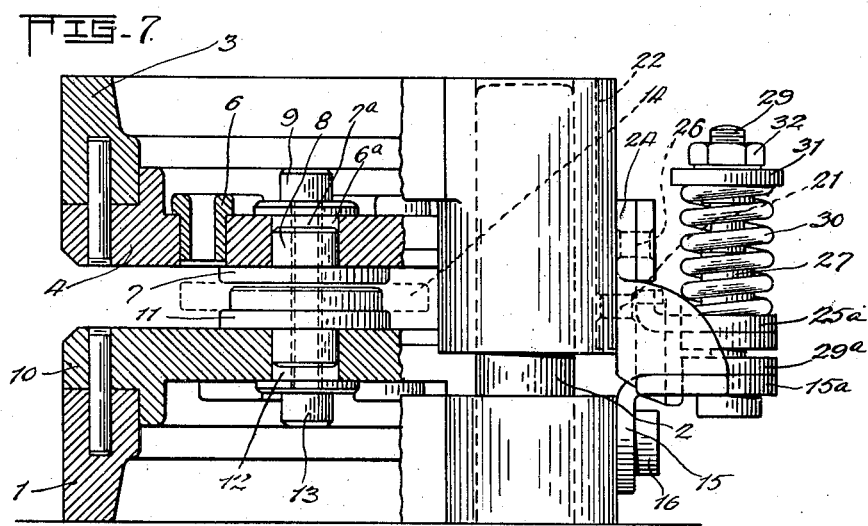
FIG-7.
INVENTOR.
FRED W. KUPPERSMITH Patented Apr. 2, 1946

2,397,493

UNITED STATES PATENT OFFICE 2,397,493

TOOL JIG

Fred W. Kuppersmith, Bloomington, Ill.

Application November 5, 1942, Serial No. 464,605

2 Claims. (Cl. 77—62)

This invention relates to jigs, and more particularly to improvements in quick clamping, box type jigs. The embodiment disclosed is especially adapted for use in connection with drilling operations.

It is an object of the invention to provide a drill jig adapted to quickly clamp a workpiece to be drilled and to hold the workpiece firmly during the drilling operation. The invention also contemplates an effective quick acting locking mechanism adaptable for use in connection with a reversible jig, if desired.

It is a particular object of the invention to provide a jig and convenient locking means therefor, which will be cheap to manufacture, convenient in operation and which will not easily get out of order; also, wherein any desired resilient pressure may be applied in order to hold the work firmly, and the jig plates may easily be locked in position or released.

Further objects will be apparent from the specification and drawings:

In the drawings:

Fig. 1 is a side elevation of one embodiment of the invention and illustrates the jig frames in clamping position with the operating handle in a position resiliently to lock the plates onto a workpiece. The partially released position of the handle is shown in dotted lines.

Fig. 2 is a bottom view of the embodiment shown in Fig. 1.

Fig. 3 is a fragmentary detailed sectional view taken on a line substantially corresponding to line 3—3 of Fig. 1, and illustrates the locking and tensioning mechanism.

Fig. 4 is a top view of the embodiment shown in Figs. 1 to 3, with the handle shown in open position in full lines and in locking position in dotted lines.

Fig. 5 is a sectional plan view taken on a line substantially corresponding to line 5—5 of Fig. 6.

Fig. 6 is a sectional elevational view through the jig frames and bushing plates and is taken on a line substantially corresponding to line 6—6 of Fig. 4, with the jig in open position to receive a workpiece therebetween.

Fig. 7 is a side elevational view of the device partially in section and with the elements shown in closed and locked position.

Fig. 8 is a composite side and elevational view of a workpiece adapted to be clamped by the jig shown in Figs. 1 to 7.

Referring to the drawings in detail, the embodiment illustrated comprises a base 1 having upright guide posts or leader pins 2 secured therein in the usual manner. An upper jig 3 is of similar contour to the base 1 and is slidably mounted on the leader pins 2 for accurate movement relative to the base. A bushing plate 4 is secured to the underside of the upper frame 3 by means of suitable machine screws 5, and this bushing plate is adapted to snugly receive drill guide bushings 6, which may be distributed as required in accordance with the desired distribution of drill holes in the workpiece.

The bushing plate 4 in the present embodiment is provided with an axial hole 6a in which is secured a work-clamping member 7, which latter is located on the plate by means of a stud 8 extending upwardly into the hole 6a. The clamping member 7 is provided with an axial upwardly extending bolt 7a shown by dotted lines, and may be secured in position by means of a flanged nut 9.

The base 1 is provided with a bushing plate 10, which latter may be very similar to the plate 4 previously described, but which is inverted in position and is provided with an anvil or mandrel 11 thereon, which latter is mounted in a central bore 12 by means of a bolt and nut 13 in the same manner as the member 7 is secured in the upper bushing plate. This mandrel 11 is adapted to receive and align a workpiece 14 thereon, which workpiece, in the present instance, is in the form of a heavy washer (see Fig. 8) and is shown in dotted lines on the mandrel 11 in Fig. 6. It will be understood that the construction of the work-holding elements may be varied to conform with the workpiece requirements.

The lower bushing plate 10 is preferably provided with clearance bushings 14a (Fig. 5) which are mounted in suitable openings in the bushing plate, so as to be in accurate alignment with the upper guide bushings 6. It will be apparent that the workpiece 14 may be clamped between the mandrel or anvil 11 and the clamp member 7 by vertical movement of the upper frame assembly.

The opening and locking mechanism of the jig comprises an angle bracket 15 pivotally secured to the back of the base 1 by means of a pivot pin 16. This pin is retained in a suitable bore 17 by means of a set screw 18 engaging in an inclined notch 19 in the pin, as illustrated in Fig. 3. An operating arm or handle 20 is pivoted at 21 on a bar 22 depending from the upper frame 3 and secured thereto by means of a machine screw 23. The handle or lever 20 is provided with a short upwardly extending arm 24, and a depending angle bracket 25 is pivotally secured thereto at 26. The outwardly extending arms 25a and 15a of the brackets 25 and 15, respectively, are in alignment as shown in Fig. 3. A guide bushing 27 is mounted in the bracket arm 25a and the arms are secured together by means of a bolt 29, which latter extends through the brackets and bushing and retains a spring 30 under a predetermined compression against the upper arm 25a by means of a washer 31 and nut 32. It will be apparent that the spring compression may be adjusted to retain the jig elements in clamping relationship at a required pressure. A washer 29a is mounted on the bolt 29 and between the brackets to limit the closed position of the jig frames and to prevent injury to the work-holding and aligning elements. The pivots 21 and 26 which movably secure the handle 20 and the upper bracket 25 together and to the upper frame 3 are so related that they provide a toggle mechanism for locking the frames in work-holding position.

When the handle is in the position shown in Fig. 1, the pivot 26 is slightly to the left of the dead center of the toggle mechanism. Therefore, the elements are held securely clamped by means of the compression spring. In this position, a pin 20a on the handle engages the upper bracket 25 and prevents further downward movement of the handle 20. When the handle is raised to the dotted line position, the pivot 26 is moved to the opposite side of the dead center line, as shown by the dotted lines, and therefore the pressure on the workpiece is relieved. Also, this movement of the handle may be continued until it is moved substantially 180° to the position shown in Fig. 6, so that the pivot 26 is moved to a position below the pivot 21 and therefore the upper frame 3 is raised to its fully open position. The drilled workpiece may then be removed and a fresh workpiece inserted.

The controlling and locking mechanism may be built almost entirely of strap iron. It may, therefore, be easily and cheaply constructed and forms a sub-assembly which may be applied to substantially any box type jig without material change in any of the elements or in the manner of assembly.

It is intended, of course, that the invention should not be limited to the specific embodiment or embodiments disclosed or to the exact details of construction shown, as obvious modifications will occur to persons skilled in the art.

Having thus described this invention, what is claimed and desired to be secured by Letters Patent is:

1. In a quick-clamping tool jig of the character described including a base frame, an upper frame mounted for reciprocation thereabove, means for firmly engaging a workpiece between said base frame and said upper frame and a hand lever pivotally secured to one of said frames for reciprocating said frames: the improvement which comprises a first bracket having an outwardly extending arm pivotally secured to one of said frames, a second bracket also having an outwardly extending arm pivotally secured directly to said hand lever at a point removed from the point at which the hand lever is pivoted to one of said frames, resilient means operating between said outwardly extending arms tending to hold them together in clamped relationship thereby providing a resilient link connection between said base frame and said upper frame whereby said frames are in workpiece-securing position when the hand lever is in one position and in workpiece-releasing position when swung to another position and wherein the pressure exerted to hold said workpiece is determined by the tensioning of said resilient means, and a stop member integral with said hand lever adapted to abut against said second bracket to prevent movement of said hand lever in one direction out of workpiece-securing position.

2. In a quick-clamping tool jig of the character described including a base frame, an upper frame mounted for reciprocation thereabove, means for firmly engaging a workpiece between said base frame and said upper frame, and a hand lever pivotally secured to said upper frame for reciprocating said frame: the improvement which comprises a first L-shaped bracket having an outwardly extending apertured arm pivotally secured to said base frame, a second L-shaped bracket also having an outwardly extending apertured arm pivotally secured directly to said hand lever at a point removed from the point at which the hand lever is pivoted to said upper frame, said arms being spaced from each other and having the apertures therein in registering relationship, means extending through said apertures for securing said arms together, resilient means associated with said last-mentioned means tending to hold said arms together in clamped relationship thereby providing a resilient link connection between said base frame and said upper frame whereby said frames are in workpiece-securing position when the hand lever is in one position and in workpiece-releasing position when swung to another position and wherein the pressure exerted to hold said workpiece is determined by the tensioning of said resilient means, and a stop member integral with said hand lever adapted to abut against said second bracket to prevent movement of said hand lever in one direction out of workpiece-securing position.

FRED W. KUPPERSMITH.